Sept. 5, 1944.   C. T. WALTER ET AL   2,357,566
TREATMENT OF ANIMAL TISSUE
Filed Feb. 9, 1942
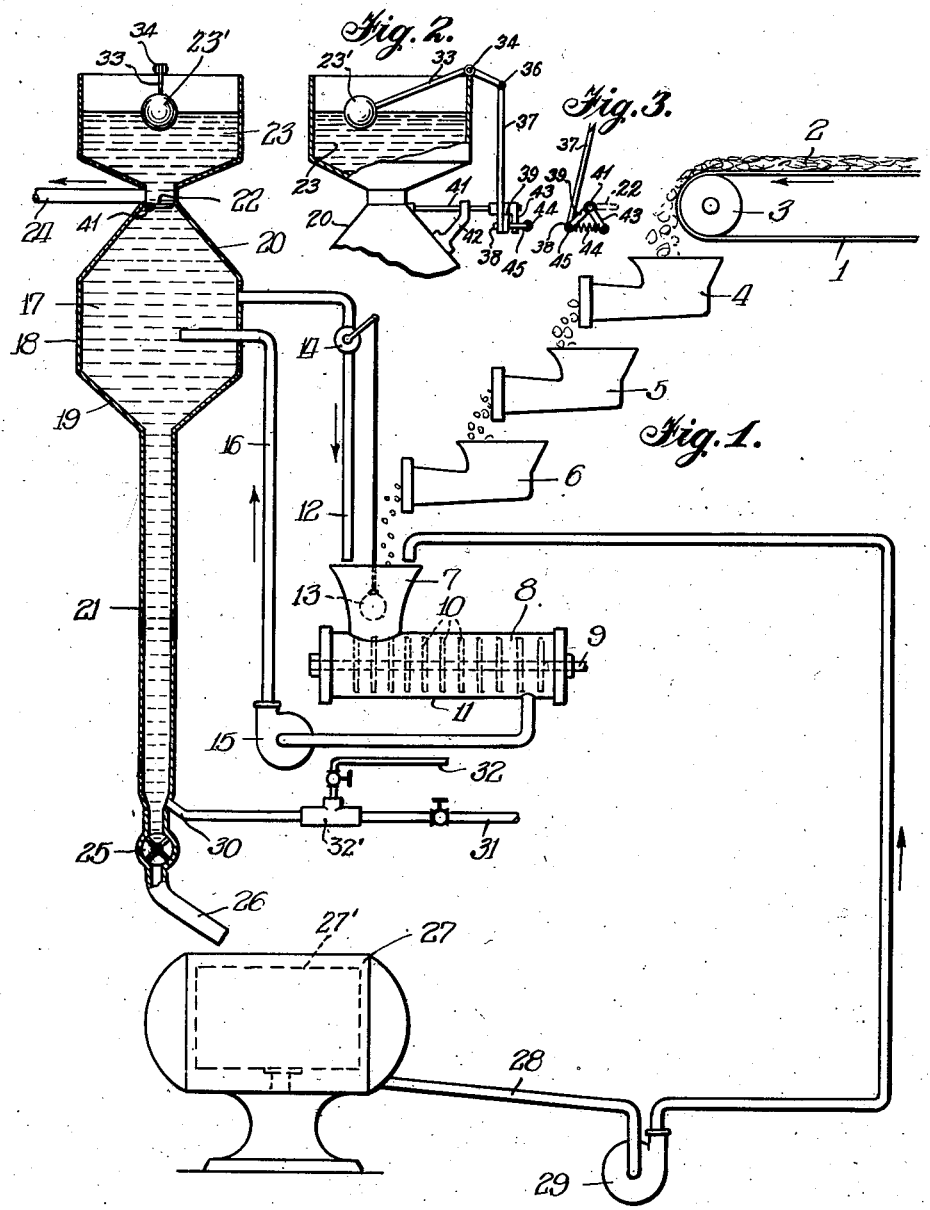
INVENTORS
C. T. Walter,
L. R. Newton and
BY R. G. Story
ATTORNEYS Patented Sept. 5, 1944

2,357,566

UNITED STATES PATENT OFFICE 2,357,566

TREATMENT OF ANIMAL TISSUE

Charles T. Walter and Lowell R. Newton, Chicago, Ill., assignors to Industrial Patents Corporation, Chicago, Ill., a corporation of Delaware Application February 9, 1942, Serial No. 430,169

16 Claims. (Cl. 146—76)

This invention relates to a process and apparatus for defatting animal tissue and more particularly to a process and apparatus for continuously liberating fatty material from non-fatty material and separating the two materials by difference in specific gravity.

The process and apparatus of the present invention are particularly applicable to defatting pork skins and will be described specifically with reference thereto although it is understood that the present invention may be employed for defatting other animal tissue having a fatty portion and a non-fatty portion.

In carrying out the present invention the animal tissue is first subjected to a hashing or grinding operation which cuts the non-fatty material into particles and scrapes the fatty material from the non-fatty material to form particles of fatty material. The particles thus formed may superficially adhere to each other but in accordance with the present invention these particles are liberated and suspended in a liquid having a specific gravity intermediate the specific gravity of the fatty material and the non-fatty material. This is accomplished by mixing the hashed animal tissue with such a liquid and subjecting the mixture to agitation. Upon introducing the resulting suspension into a quiescent separating zone, the non-fatty material sinks in the liquid and can be removed from the lower portion of a body of the liquid while the fatty material rises to the surface and can be removed from the upper portion of such body of liquid.

The present invention is concerned with a continuous operation in which the animal tissue is continuously fed into the apparatus or process and the fatty material continuously separated from the non-fatty material and discharged from the system. The formation of the suspension of particles is carried out in an agitating zone separate from the separating zone. In the preferred embodiment of the invention water is employed as the suspending and separating liquid. In the agitating zone the adhering fat particles as well as a thin layer or film of fat which tends to adhere to the non-fatty material are washed from the non-fatty material. A continuous controlled recirculation of water between the separating zone and the agitating zone is employed to furnish water to form the suspension referred to and this water serves as a medium for carrying the suspended particles to the separation zone. Also any adhering particles of fatty material and non-fatty material which may happen to reach the separating zone and have an average specific gravity approaching that of water are recycled through the mixing or agitating step for further treatment.

Wash water is continuously introduced into the separating zone to wash the non-fatty material settling therein with fresh water. Water discharging from the system may be employed to carry the separated fatty material out of the system. The continuous introduction and the withdrawal of water prevents the building up of an emulsion of fat and water which might disturb the gravity balance of the system and prevent effective separation. The temperature of the system can be most conveniently controlled by the temperature of the incoming water although it is apparent that any desired portion of the system may be heated or cooled if desired. In general, the temperature employed will be below the rendering temperature of the fatty material, that is, below a temperature at which a substantial portion of the fat is melted. In operating upon certain materials a relatively high temperature which softens or partially melts the fat but which does not liquefy the same is advantageous as such temperatures assist in liberating the fatty material from the non-fatty material, while with other materials lower temperatures, including temperatures as low as those approaching the freezing point of water, may be employed. When an unmodified non-fatty material is the desired end product, the temperatures employed will be below those at which substantial cooking or coagulation of the protein occurs, which temperatures are approximately the same as the softening point of the fat.

The fatty material can be delivered to a rendering operation forming no part of the present invention while excess water, if desired, may be removed from the non-fatty material to produce a comminuted material freed from fat to substantially any desired extent. In the case of pork skins the comminuted non-fatty skin tissue is particularly suitable for gelatin manufacture and can be prepared in relatively dry form for storage and transportation.

An object of the present invention is, therefore, to provide an improved continuous process and apparatus for defatting animal tissue.

Another object of the invention is to provide an improved process and apparatus for continuously defatting animal tissue wherein temperatures below the rendering temperature of the fatty material are employed.

Another object of the invention is to provide an improved process and apparatus in which the non-fatty material, separated from the fatty material by a flotation process, is subjected to a washing with fresh liquid such as water just prior to being discharged from the separation step.

Another object of the invention is to provide a process and apparatus for defatting animal tissue in which comminuted animal tissue made up of particles of fatty and non-fatty material are subjected to a flotation separation step in which water is continuously withdrawn from the flotation operation and employed to carry additional animal tissue to the flotation step.

Another object of the invention is to provide an improved process for defatting animal tissue involving a flotation separation between particles of fatty material and non-fatty material in which adhering particles of fatty and non-fatty material are withdrawn from the flotation operation, subjected to agitation in the presence of water and returned to the flotation operation.

Another object of the invention is to provide an improved apparatus for separating fatty material from non-fatty material which is entirely automatic in operation and which enables non-fatty material to be separated from adhering fatty material at temperatures below the rendering temperature of the fatty material.

Other objects and advantages of the invention will appear in the following description of a preferred embodiment of the invention made in connection with the drawing of which:

Fig. 1 is a diagrammatic view of the complete apparatus;

Fig. 2 is a fragmentary view similar to Fig. 1 showing the operation of the fatty material discharge mechanism; and Fig. 3 is a view similar to Fig. 2 showing the detail of Fig. 2.

The apparatus of the present invention may include a feeding means for the animal tissue shown as a conveyor 1 upon which animal tissue 2 may be placed. In the embodiment of the invention herein specifically described this animal tissue may be pieces of pork skin with fat adhering thereto, and may be placed upon the upper flight of the conveyor and in a relatively uniform thick layer. The conveyor may include a roller 3 over which the conveyor passes and the conveyor may be driven at a relatively low speed to discharge the animal tissue into a hashing machine or grinder shown diagrammatically at 4. In a preferred embodiment of the invention the hashing machine 4 cuts the animal tissue into relatively coarse particles which are delivered into a hashing machine 5 which cuts the animal tissue into smaller pieces, in turn delivered into a hashing machine which cuts the animal tissue into still finer particles. By using a plurality of hashers in series it is possible to hash or grind the animal tissue into relatively small particles much more efficiently than if a single hasher were employed for the same fineness of particles. The hashing machines may be of the usual sausage grinding type and cut the relatively tough non-fatty animal tissue into particles while scraping the fatty material from the particles of non-fatty material.

The mixture of particles of fatty and non-fatty material may be delivered from the hasher 6 into a hopper 7 of an agitator 8 provided with a central shaft 9 upon which are mounted a plurality of agitating blades 10. The casing 11 of the agitator may be closed except for the communicating passage with the hopper 7 and a discharge conduit hereafter described. A stream of water may be delivered through a pipe 12 into the hopper 7 under control of a float 13 in the hopper 7 and a float operated valve 14 in the pipe 12. The float 13 and valve 14 maintain a definite level of material in the hopper 7 so that the agitator 8 is maintained full of water and animal tissue.

In the agitator 8 the hashed animal tissue is thoroughly admixed and agitated with water so as to substantially completely separate the particles of fatty material from the non-fatty material and wash the non-fatty material substantially free of any adhering film of fat. The resulting suspension may be withdrawn from the bottom of the agitator by means of a pump 15 and delivered through a conduit 16 into the central portion of a separating chamber 17. The separating chamber 17 preferably has an intermediate cylindrical portion 18, a lower relatively steep conical portion 19, and an upper relatively steep conical portion 20. The lower conical portion 19 preferably terminates in an elongated cylindrical portion 21 extending downwardly from the conical portion 19.

The upper end of the upper conical portion 20 is preferably provided with a float operated valve 22 capable of alternately closing or at least partially closing communication between the separating chamber 17 and an upper fat collecting chamber 23. The valve 22 may be operated by the float 23' as hereafter described and also controls communication between the fat collecting chamber 23 and a discharge conduit 24 which may lead to a fat rendering operation.

Non-fatty material descends through the column or leg of liquid in the elongated portion 21 of the separating chamber 17 and collects in the lower portion thereof. This material may be discharged from the separating chamber through any suitable discharge valve such as a rotatable star valve 25 driven from any suitable source of power (not shown) along with any water entering the star valve. The non-fatty material and water may be discharged through a conduit 26 into the bowl 27' of a basket type centrifugal machine 27. Rotation of the centrifugal bowl forces the water through the foraminous walls of the bowl 27' which water may be discharged from the centrifugal machine through the conduit 28. The non-fatty material collects in the bowl 27'. It will be apparent that a plurality of centrifugal machines 27 may be employed so that the process can be made continuous by delivering material from the conduit 26 into such machines in sequence enabling the fatty material to be removed from the machines not in use. The water discharged from the centrifugal machine 27 through the conduit 28 may be returned by means of a pump 29 to the hopper 7 of the agitator 8.

Fresh water may be continuously admitted to the process through the conduit 30 so as to pass upwardly through the lower extension 21 of the separating chamber 17 thus washing the downwardly passing non-fatty material therein. The temperature of the material in the separating zone may be controlled by controlling the temperature of the water admitted to the conduit 30 and this may be accomplished by delivering fresh water through a pipe 31 and steam through a pipe 32 to a mixing zone 32' from which the conduit 30 leads to the extension 21. By controlling the relative proportions of steam and water any desired temperature can be maintained and, if desired, known thermostatic apparatus (not shown) can be employed for this purpose.

It has been found advantageous to periodically discharge the fatty material from the process as by so doing a relatively large amount of water can be simultaneously discharged to serve as a carrying medium for the fatty material. The chamber 23 in conjunction with the float valve 23' and valve 22 can be employed for this purpose. As shown in Fig. 2 the float valve 23' may be connected to one arm of a lever 33 pivoted intermediate its ends at 34 to a wall of the fat receiving chamber 23 and having its other arm pivoted at 36 to a link 37. The link 37 may have its other end pivoted at 38 to an arm 39 loosely journaled on the shaft 41 of the valve 22. The shaft 41 may extend from the casing of the separating chamber 17 and be journaled in a bearing 42. The shaft 41 may also have an arm 43 secured to its outer end and a tension spring 44 may extend between the end of the arm 43 and an extending member 45 on the end of the arm 39. The float 23' is shown in its uppermost position and the valve 22 is shown in a position in which communication between the conduit 24 and the fat receiving chamber 23 is established and communication between the separating chamber 17 and the fat receiving chamber 23 is at least partially closed. It will be apparent that the liquid in the fat receiving chamber 23 will be discharged through the conduit 24 and that the float 23' will fall with the liquid level in the chamber 23. This motion of the float valve 23' will cause upward reciprocation of the link 37 to rotate the arm 39 journaled on the shaft 41 clockwise in Fig. 3. During the initial portion of this movement the valve 22 will remain stationary but as soon as the spring 44 has passed over the center of the shaft 41 the arm 43 will be rotated counterclockwise in Fig. 3 to rotate the valve 22 in Figs. 1 and 3 counterclockwise to close the opening into the conduit 24 and reestablish free communication between the chambers 17 and 22. During initial upward movement of the float 23' as the chamber 23 fills, the valve 22 again remains stationary until the arm 39 has been lowered sufficiently to carry the spring 44 again past the center of the shaft 41 whereupon the valve 22 will be closed.

In operating the process and apparatus of the present invention, animal tissue containing fatty and non-fatty material is placed in a relatively thick layer on the conveyor 1 and gradually fed into the hopper of the hasher 4. By way of example, when operating upon pork skin the hasher 4 may be equipped with a cutting blade having relatively large holes, for example, 1¼" in diameter so as to cut the animal tissue into rather large pieces. This hashed material is delivered into the grinder 5 which may be equipped with a plate having somewhat smaller holes, for example about $\frac{5}{16}$" in diameter. The material from the grinder 5 may be delivered into the grinder 6 which may have a plate with still smaller holes, for example, about $\frac{3}{16}$" in diameter. The particle sizes given are in general suitable for pork skins but may vary considerably, for example, the final particles may vary from $\frac{1}{16}$" to $\frac{3}{8}$" depending upon the degree of defatting desired and the nature of the material being defatted. In defatting meat to be employed for edible ground meat even larger particle sizes may be employed, for example, particles as large as ¾" in diameter.

The hashed material which is largely made up of discrete particles of fatty material and non-fatty material superficially adhering together is discharged into the hopper 7 of the agitator 8 along with a substantial quantity of water from the pipe 12. This water and hashed material enter the agitator 8 wherein the hashed animal tissue is vigorously agitated with the water so that the fatty material is substantially completely liberated from the particles of non-fatty material. This mixture is withdrawn from the agitator 18 and delivered into the intermediate portion of the separating chamber 17. It will be appreciated that the amount of water delivered into the hopper 7 from the pipe 12 is determined by the amount of water withdrawn from the agitator 8 by the pump 15 as the float 13 and valve 14 maintain a substantially constant liquid level in the hopper 7 irrespective of the amount of water drawn from the agitator 8. By employing a relatively constant feed of hashed animal tissue and varying the speed of the pump 15, or vice versa, any desired proportion of water to hashed animal tissue may be obtained. The proportions are not critical so long as sufficient water is fed into the hopper 7 to enable the particles of animal tissue to be substantially completely liberated from each other in the agitator 8.

The separating chamber 17 should be of sufficient size to provide a substantially quiescent zone for stratification of the particles of fatty material and non-fatty material therein. The non-fatty material sinks in the water and passes downwardly through the column in the extension 21 and as it collects in the bottom thereof is discharged through the star valve 25 into the centrifugal separator 27. Fresh water at the desired temperature is introduced through the conduit 30 and passes upwardly counter-current to the descending non-fatty material so as to wash the same in the column 21. The amount of fresh water is not critical except that it should be enough to prevent the water in the system from becoming too contaminated with fat emulsified therein and juices extracted from the animal tissue and should not remain in the system long enough to enable any substantial amount of bacterial growth therein. The amount of water should also be sufficient to act as a carrier for discharge of the separated fatty material from the system but should not be great enough in amount to cause the upward current in the column 21 to prevent settling of the non-fatty material.

As the water separated from the non-fatty material in the centrifugal separator 27 is returned to the system by means of the pump 29 through the hopper 7 the only discharge of water from the system is through the fat withdrawal conduit 24. The fat floats upwardly in the separating chamber 17 and collects adjacent the surface of the water in the fat collecting chamber 23. When this chamber becomes full of water carrying fatty material the float valve opens the end of the conduit 24 so that this fatty material is flushed from the fat receiving chamber 23 by the water therein. The valve 22 cannot completely close communication between the chambers 17 and 23 as water is continuously fed into the system through the pipe 30 and must escape from the system through the opening between the chambers 17 and 23. Any particles of fatty material which may adhere to particles of non-fatty material may produce a small amount of material of intermediate specific gravity so that it remains suspended adjacent the neutral zone in the separation chamber 17. Such material is withdrawn from the chamber through the pipe 12 and redelivered to the agitator 8 wherein the fatty material is separated from the non-fatty particles and this material is again returned to the separating chamber 17 until separation is effected.

The temperature of the mixture in the system will vary with the nature of the materials being treated. For defatting pork skins it has been found that temperatures in the neighborhood of 100° F. are suitable. Such temperatures are below the rendering temperatures of the fatty material, that is, they are below the temperature which will melt a substantial portion of the fatty material. These temperatures may partially melt the fat of the fatty material so that the fat is softened to assist in liberation of fat from the non-fatty material but for most operations in accordance with the present invention substantially complete melting of the fat is undesirable primarily because such temperatures will damage the non-fatty material by partially cooking the same. It is, of course, understood that the apparatus is susceptible of being employed for a rendering operation as well as fat flotation process. For separating fat from meat intended to be recovered as raw ground meat, temperatures approaching the freezing point of water are desirable and it will be apparent that for different animal tissues temperatures ranging from the freezing point of water up to temperatures approaching the boiling point of water may be employed.

While we have disclosed the preferred embodiment of my invention it is understood that the details thereof may be varied within the scope of the following claims.

We claim:

1. The method of defatting animal tissue containing fatty portions and non-fatty portions, which comprises, hashing said animal tissue to form particles of fatty material and non-fatty material, continuously delivering a stream of said hashed animal tissue and a stream of water to a continuous agitating zone for distributing said particles in said water, withdrawing a stream of the resulting mixture and delivering the same into a separation zone containing water whereby said fatty material rises in said water and said non-fatty material sinks in said water, withdrawing water from an intermediate area in said separation zone to constitute the water feed for said agitating zone, introducing a stream of fresh water into said separation zone countercurrent to the settling movement of said non-fatty material to wash the same and separately discharging said fatty material and said non-fatty material from said separation zone.

2. The method of defatting animal tissue containing fatty portions and non-fatty portions, which comprises, hashing said animal tissue to form particles of fatty material and non-fatty material, continuously delivering a stream of said hashed animal tissue and a stream of water to a continuous agitating zone for distributing said particles in said water, withdrawing a stream of the resulting mixture and delivering the same into a separation zone containing water whereby said fatty material rises in said water and said non-fatty material sinks in said water, withdrawing water from an intermediate area in said separation zone to constitute the water feed for said agitating zone, introducing a stream of fresh water into said separation zone countercurrent to the settling movement of said non-fatty material to wash the same, employing water displaced from said separating zone by said fresh water for carrying fatty material away from the top of said separation zone, and discharging non-fatty material from the bottom of said separation zone.

3. The method of defatting animal tissue containing fatty portions and non-fatty portions, which comprises, hashing said animal tissue to form particles of fatty material and non-fatty material, continuously delivering a stream of said hashed animal tissue and a stream of water to a continuous agitating zone for distributing said particles in said water, withdrawing a stream of the resulting mixture and delivering the same into a separation zone containing water whereby said fatty material rises in said water and said non-fatty material sinks in said water, withdrawing water from an intermediate area in said separation zone to constitute the water feed for said agitating zone, introducing a stream of fresh water into said separation zone countercurrent to the settling movement of said non-fatty material to wash the same, withdrawing non-fatty material and water from the bottom of said separating zone, separating from the non-fatty material a major portion of the water withdrawn therewith and returning the separated water to said agitating zone, and employing the water displaced from said separation zone by said fresh water for carrying fatty material away from the top of said separation zone.

4. The method of defatting animal tissue containing fatty portions and non-fatty portions, which comprises, hashing said animal tissue to form particles of fatty material and non-fatty material, continuously delivering a stream of said hashed animal tissue and a stream of water to a continuous agitating zone for distributing said particles in said water, withdrawing a stream of the resulting mixture and delivering the same into a separation zone containing water whereby said fatty material rises in said water and said non-fatty material sinks in said water, withdrawing water from an intermediate area in said separation zone to constitute the water feed for said agitating zone, introducing a stream of fresh water into said separation zone countercurrent to the settling movement of said non-fatty material to wash the same, withdrawing non-fatty material and water from the bottom of said separation zone, separating from the non-fatty material a major portion of the water withdrawn therewith and returning the separated water to said agitating zone, collecting the water displaced from said separation zone at the top of said separation zone along with fatty material separated from said non-fatty material, and periodically discharging said collected water and fatty material.

5. The method of defatting animal tissue containing fatty portions and non-fatty portions, which comprises, hashing said animal tissue to form particles of fatty material and non-fatty material, continuously delivering said hashed animal tissue into an agitating zone, simultaneously delivering a stream of a liquid having a specific gravity intermediate the specific gravities of said fatty and non-fatty portions to said agitating zone, agitating said hashed animal tissue in said agitator to liberate said particles from each other and suspend the same in said liquid, withdrawing a stream of the resulting mixture and delivering the same into a separation zone containing said liquid whereby said fatty material rises in said liquid and said non-fatty material sinks in said liquid, withdrawing the liquid from an intermediate area in said separation zone to constitute liquid feed for said agitating zone, introducing a stream of fresh liquid into said separation zone counter-current to the settling movement of said non-fatty material to wash the same, and separately discharging said fatty material and said non-fatty material from said separation zone.

6. The method of defatting animal tissue containing fatty portions and non-fatty portions, which comprises, hashing said animal tissue to form particles of fatty material and non-fatty material, continuously delivering said hashed animal tissue into an agitating zone, simultaneously delivering a stream of a liquid having a specific gravity intermediate the specific gravities of said fatty and non-fatty portions to said agitating zone, agitating said hashed animal tissue in said agitator to liberate said particles from each other and suspend the same in said liquid, withdrawing a stream of the resulting mixture and delivering the same into a separation zone containing said liquid whereby said fatty material rises in said liquid and said non-fatty material sinks in said liquid, withdrawing the liquid from an intermediate area in said separation zone to constitute liquid feed for said agitating zone, introducing a stream of fresh liquid into said separation zone counter-current to the settling movement of said non-fatty material to wash the same, maintaining the temperature of the materials in said agitation zone and said separation zone below the rendering temperature of said fatty material and separately discharging said fatty material and said non-fatty material from said separation zone.

7. The method of defatting animal tissue containing fatty portions and non-fatty portions, which comprises, hashing said animal tissue to form particles of fatty material and non-fatty material, continuously delivering a stream of said hashed animal tissue and a stream of water to a continuous agitating zone for distributing said particles in said water, withdrawing a stream of the resulting mixture and delivering the same into a separation zone containing water whereby said fatty material rises in said water and said non-fatty material sinks in said water, withdrawing water from an intermediate area in said separation zone to constitute the water feed for said agitating zone, introducing a stream of fresh water into said separation zone counter-current to the settling movement of said non-fatty material to wash the same, controlling the temperature of said fresh water to maintain the temperature of the materials in said agitation zone and said separation zone below the rendering temperature of said fatty material, and separately discharging said fatty material and said non-fatty material from said separation zone.

8. Apparatus for defatting animal tissue, which comprises, means for hashing said tissue to cut the same into particles, an agitator for receiving said hashed material and mixing the same with water to produce a suspension of said particles in said water, a separating chamber for separating particles of fatty material from particles of non-fatty material by flotation of said fatty material, means for delivering a stream of said suspension into said separating chamber intermediate its height, means for withdrawing a stream of water from said separating chamber intermediate its height and from a point separated from the point of introduction of said suspension and delivering said withdrawn stream of water to said agitator for mixing with said hashed animal tissue, said separation zone having a relatively narrow lower extension through which said non-fatty material settles, means for introducing fresh water into the lower portion of said extension to flow counter-current to said settling non-fatty material to wash the same, and means for discharging fatty material from the top of said separation chamber and non-fatty material from the bottom of said separation chamber.

9. Apparatus for defatting animal tissue, which comprises, means for hashing said tissue to cut the same into particles, an agitator for receiving said hashed material and mixing the same with water to produce a suspension of said particles in said water, a separating chamber for separating particles of fatty material from particles of non-fatty material by flotation of said fatty material, means for delivering a stream of said suspension into said separating chamber intermediate its height, a conduit for withdrawing a stream of water from said separating chamber intermediate its height and from a point spaced from the point of introduction of said suspension and delivering said withdrawn stream of water to said agitator for mixing with said hashed animal tissue, float control means in said agitator for maintaining a predetermined liquid level therein and to insure that the amount of material entering said agitator balances the amount of material delivered therefrom to said separation chamber, and means for separately discharging fatty material from the top of said separation chamber and non-fatty material from the bottom of said separation chamber.

10. Apparatus for defatting animal tissue, which comprises, a separation chamber having an upper portion of relatively large diameter and a relatively deep downwardly extending lower portion of smaller diameter, a fat collecting chamber above said separation chamber and communicating therewith, means for delivering a suspension of particles of fatty material and non-fatty material into said upper portion intermediate its height, whereby said non-fatty material settles through said lower portion and said fatty material collects in said fat collecting chamber, means for introducing fresh water into said lower portion adjacent its lower end to wash said non-fatty material during settling, means for periodically discharging water along with collected fatty material from said collecting chamber, and means for discharging non-fatty material from the lower end of said lower portion.

11. Apparatus for defatting animal tissue, which comprises, a separation chamber having an upper portion of relatively large diameter and a relatively deep downwardly extending lower portion of smaller diameter, a fat collecting chamber above said separation chamber and communicating therewith, means for delivering a suspension of particles of fatty material and non-fatty material into said upper portion intermediate its height, whereby said non-fatty material settles through said lower portion and said fatty material collects in said fat collecting chamber, means for introducing fresh water into said lower portion adjacent its lower end to wash said non-fatty materials during settling, means for periodically discharging water along with collected fatty material from said collecting chamber, means for discharging non-fatty material from the lower end of said lower portion, said last named means comprising a star valve for removing said non-fatty material along with water from said lower portions, means for separating a major portion of the water discharged with said non-fatty material from said non-fatty material, and means for returning the separated water to said separation chamber.

12. Apparatus for defatting animal tissue, which comprises, a separation chamber having an upper portion of relatively large diameter and a relatively deep downwardly extending lower portion of smaller diameter, a fat collecting chamber above said separation chamber and communicating therewith, means for delivering a suspension of particles of fatty material and non-fatty material into said upper portion intermediate its height, whereby said non-fatty material settles through said lower portion and said fatty material collects in said fat collecting chamber, means for introducing fresh water into said lower portion adjacent its lower end to wash said non-fatty material during settling, means for periodically discharging water along with collected fatty material from said collecting chamber, means for discharging non-fatty material from the lower end of said lower portion, said last named means comprising a star valve for removing said non-fatty material along with water from said lower portions, and means including a centrifugal separator for separating a major portion of the water discharged with said non-fatty material from said non-fatty material.

13. The method of defatting animal tissue containing fatty portions and non-fatty portions, which comprises, hashing said animal tissue to form particles of fatty material and non-fatty material, continuously delivering said hashed animal tissue into an agitating zone, simultaneously delivering a stream of liquid having a specific gravity intermediate the specific gravities of the fatty and non-fatty portions to said agitating zone, agitating said hashed animal tissue in said agitator to liberate said particles from each other and suspend the same in said liquid, withdrawing a stream of the resulting mixture and delivering the same into a separation zone containing said liquid whereby said fatty material rises in said liquid and said non-fatty material sinks in said liquid, withdrawing the liquid from an intermediate area in said separation zone to constitute liquid feed for said agitating zone, and separately discharging said fatty material and said non-fatty material from said separation zone.

14. The method of defatting animal tissue containing fatty portions and non-fatty portions, which comprises, hashing said animal tissue to form particles of fatty material and non-fatty material, continuously delivering said hashed animal tissue into an agitating zone, simultaneously delivering a stream of liquid having a specific gravity intermediate the specific gravities of the fatty and non-fatty portions to said agitating zone, agitating said hashed animal tissue in said agitator to liberate said particles from each other and suspend the same in said liquid, withdrawing a stream of the resulting mixture and delivering the same into a separation zone containing said liquid whereby said fatty material rises in said liquid and said non-fatty material sinks in said liquid, withdrawing the liquid from an intermediate area in said separation zone to constitute liquid feed for said agitating zone, controlling the amount of liquid withdrawn from said separation zone from the volume of material in the agitating zone, and separately discharging said fatty material and said non-fatty material from said separation zone.

15. The method of defatting animal tissue containing fatty portions and non-fatty portions, which comprises, hashing said animal tissue to form particles of fatty material and non-fatty material, continuously delivering a stream of said hashed animal tissue and a stream of water to a continuous agitating zone for distributing said particles in said water, withdrawing a stream of the resulting mixture and delivering the same into a separation zone containing water whereby said fatty material rises in said water and said non-fatty material sinks in said water, withdrawing water from an intermediate area in said separation zone to constitute the water feed for said agitating zone, employing water displaced from said separating zone by said fresh water for carrying fatty material away from the top of said separation zone, and discharging non-fatty material from the bottom of said separation zone.

16. Apparatus for defatting animal tissue, which comprises, means for hashing said tissue to cut the same into particles, an agitator for receiving said hashed material and mixing the same with water to produce a suspension of said particles in said water, a separating chamber for separating particles of fatty material from particles of non-fatty material by flotation of said fatty material, means for delivering a stream of said suspension into said separating chamber intermediate its height, means for withdrawing a stream of water from said separating chamber intermediate its height and from a point separated from the point of introduction of said suspension and delivering said withdrawn stream of water to said agitator for mixing with said hashed animal tissue, means for introducing fresh water into the lower portion of said separation chamber to flow counter-current to said settling non-fatty material to wash the same, and means for discharging fatty material from the top of said separation chamber and non-fatty material from the bottom of said separation chamber.

CHARLES T. WALTER.
LOWELL R. NEWTON.